INVENTORS.
FRANK N. GILLETTE
GEORGE W. KING
BY H. L. Mackey
ATTORNEY.

INVENTOR.
FRANK N. GILLETTE
GEORGE W. KING
BY
A. L. Mackey
ATTORNEY.

Patented Oct. 26, 1954

2,692,912

UNITED STATES PATENT OFFICE 2,692,912

TELEVISION SYNCHRONIZING PULSE CIRCUIT

Frank N. Gillette and George W. King, Pleasantville, N. Y., assignors to General Precision Laboratory Incorporated, a corporation of New York Application September 12, 1952, Serial No. 309,216

9 Claims. (Cl. 178—69.5)

This invention relates to television circuits for reshaping horizontal synchronization pulses, and more specifically to such circuits as used in the video section of television receivers.

In the reception of television signals circuits are incorporated in the receiver for segregating the received synchronization signals from the video signals and then separating the horizontal synchronization signal from the vertical synchronization signal. However, the separated horizontal synchronization signal is usually imperfectly separated and is then regenerated to a greater or less extent, usually by the use of some form of free-running oscillator triggered by the imperfect pulses. It is often deemed sufficient to employ relatively crude reshaping or regenerating circuits and to rely on compromise adjustments of their time constants to secure synchronism of the resulting reshaped synchronizing pulses while securing immunity from the several types of irregularity inherent in the separated horizontal synchronization signal.

The defects inherent in horizontal synchronizing pulses as received have two principal causes. First, the double-frequency horizontal pulses in the vertical equalizing periods are not likely to be received with the normal width and amplitude, and second, the double-frequency pulses in the vertical synchronizing pulse block are likely to produce erroneous information.

When these received horizontal synchronizing signals are not properly reshaped their effect on the television picture is serious, leading to vertical curvature of the picture, particularly apparent at the vertical edges of the frame. When phase distortion of the horizontal sawtooth wave form is present, both vertical edges and all intervening parts of the picture are wavy, being usually more severe at the top. When amplitude distortion is also present, the waviness is caused to vary in amount from one side of the picture to the other.

The instant invention contemplates a circuit arrangement in which the received synchronizing signals are reshaped and reformed to provide a train of perfect signals which in turn will act through suitable deflection circuits to produce a picture free of distortional displacements. In general the invention contemplates a circuit wherein a gating signal is generated in timed relation to the operation of the sweep generator, the gating signal being utilized to periodically block transmission of the horizontal synchronizing signals in such a manner as to prevent the occurrence of double frequency pulses in the sweep generating circuits. Additionally those horizontal synchronizing signals which are permitted to be transmitted are compared with the horizontal deflection signals producing therefrom an error signal which acts to immediately correct the frequency of a trigger generator utilized to initiate the sawtooth wave form applied to the deflection circuits.

The general purpose of this invention then is to provide television receiver circuits for reshaping and regenerating horizontal synchronization signals for use in triggering the horizontal scanning circuit.

More specifically, the purpose of this invention is to provide a pulse gating circuit for use with a local oscillator circuit so that at no time will the oscillator be affected by double-frequency signals.

Still more specifically, the purpose of this invention is to provide in a television receiver or video monitor an automatic frequency control circuit having optimum speed of response, and to provide a gating and reforming circuit to supply it with a train of substantially perfect and continuous horizontal synchronizing pulses of constant width, and which contains no double-frequency pulses.

A further understanding of this invention can be secured from the following detailed description and associated drawings, in which.

Figure 1:
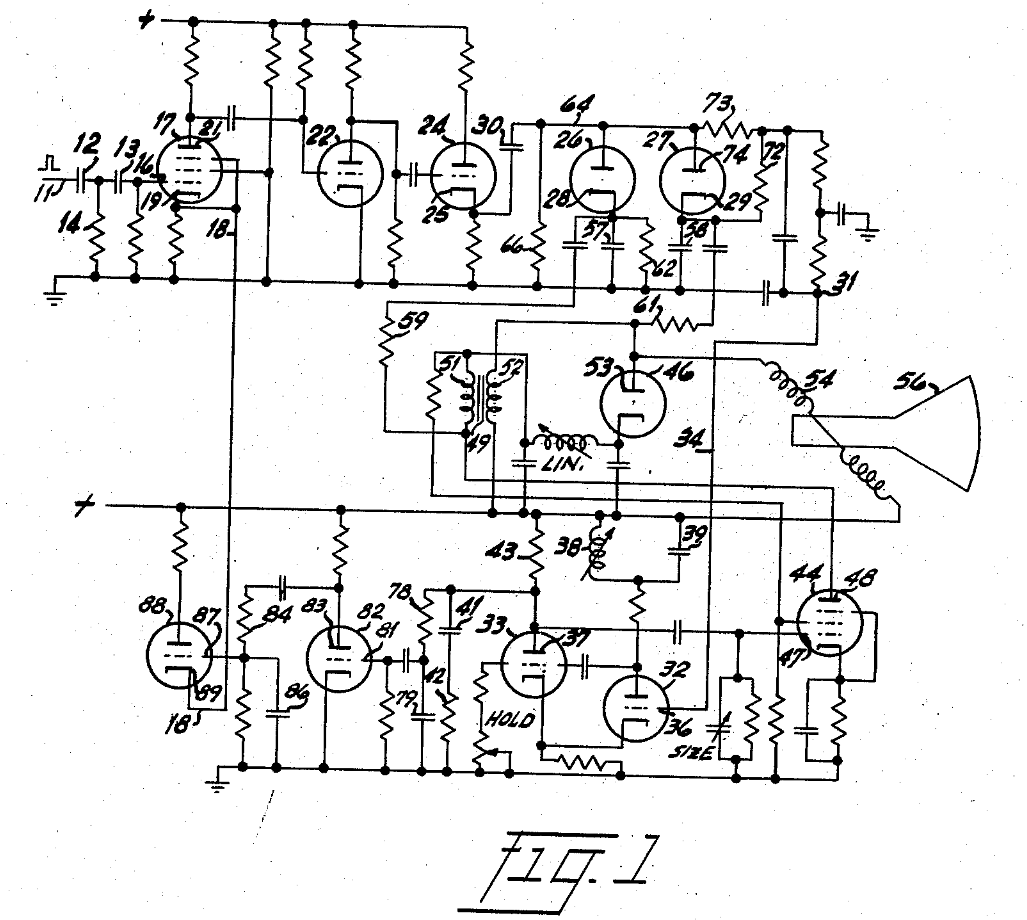
Figure 1 is a schematic diagram of an embodiment of the invention.

Referring now to Fig. 1, the complete synchronizing signal containing vertical and horizontal synchronizing pulses, but not containing that part of the video signal conveying picture information, is secured in the usual manner from the video and synchronization signal separator circuit of a television monitor or receiver and is introduced to the circuit at 11. The horizontal synchronization pulses at this point have been clipped or limited and ideally appear as in graph A of Fig. 2. However, during the vertical synchronization and equalizing pulse intervals, double-frequency horizontal pulses of half width appear, as at B. The signal is applied to a differentiating circuit consisting of condenser 12 and resistor 14, which act to differentiate the signal, producing the wave form C of Fig. 2.

The sharp positive and negative pulses of the wave form C are applied to the control grid 16 of a pentode 17 which is gated or alternately made conductive and non-conductive by means of the application of a periodically varying potential applied to the cathode 19 through the conductor 18. The periodicity of this potential is that of horizontal synchronization, or 15,750 C. P. S., and the phase is as shown at D, Fig. 2, with the pentode 17 made conductive for about 25 μs of each 63 μs horizontal period, centered at leading edges of the horizontal synchronizing pulses of graph A. The negative peaks shown in C are below tube cutoff at all times, and the half-period positive peaks are removed by the gate D, so that only the full-period positive peaks of C appear at the plate 21, inverted, as at E. The following clipper amplifier triode 22 clips and inverts these pulses to apply rectangular pulses as shown at F to the cathode follower 24. These pulses are the reshaped horizontal synchronizing pulses with all double-frequency pulses removed and all made to have exactly the same width, even during the 190 μs period of the vertical synchronizing pulse. Therefore, all disturbing influences due to the inherent variations in horizontal pulses as initially received are removed from the subsequent portions of the horizontal sweep circuit.

These reshaped horizontal synchronizing pulses are compared in a comparison detector with pulses as applied to the picture tube yoke, and a direct-current error voltage is derived for control of the frequency of the picture tube pulses. The comparison detector may have any of a large variety of forms but a preferred form comprises two diodes 26 and 27 to the cathodes 28 and 29 of which are applied integrated voltage forms derived from the final stages of the sweep circuit in a manner which will be explained later. The comparison detector also is supplied from the cathode 25 of cathode follower 24, through coupling condenser 30, with the series of reshaped horizontal pulses. The comparison detector output consisting of a generally continuous voltage level is passed through an anti-hunt resistor-condenser network terminating at junction 31, from which junction a smoothed direct-current output voltage is derived which represents the phase difference of the input signals applied to the comparison detector.

The direct-current error voltage derived at 31 is applied to a free-running multivibrator comprising triodes 32 and 33. This multivibrator normally has a free period slightly longer than the horizontal pulse period, but the application of the direct voltage from junction 31 through conductor 34 to bias the grid 36 decreases the period by an amount dependent on the magnitude of the bias. The constancy of multivibrator period is increased by the superposition of a sinusoidal oscillation secured from the inductance 38 and condenser 39. The multivibrator output at plate 37 is applied to a sawtooth generating resistance capacity circuit comprising condenser 41 and resistors 42 and 43, the resulting waveshape at plate 37 being shown at G, Fig. 2.

This wave form is applied to a final amplifier tube and damper tube. There is a large variety of circuits in use for performing the functions of these tubes but in the present example it is preferred to employ a circuit using a pentode final amplifier tube 44 and a diode damper 46. The wave form of graph G is applied to the control grid 47 of the pentode 44, where the negative spike, being below cutoff, is removed and the output at the plate 48 is a sawtooth current wave form and a pulse voltage wave form. The voltage across the primary coil 51 of the transformer 49 has the form of graph J, and a similar voltage, reversed as shown in graph K, is applied from the secondary coil 52 to the plate 53 of the damper tube 46 and to the horizontal yoke coil 54 of the picture tube 56.

Figure 2:
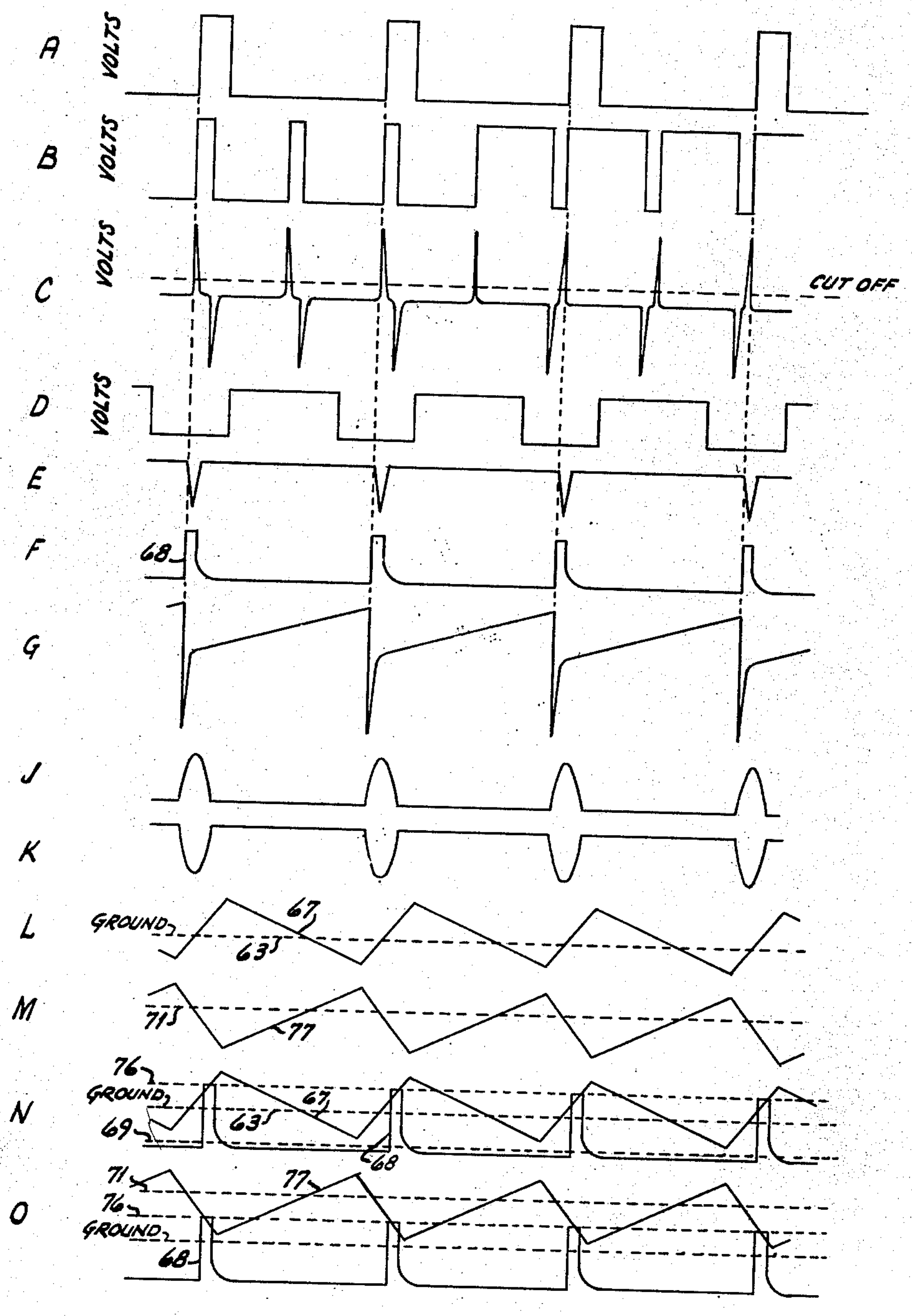
Figure 2 are graphs which assist in illustrating the operation of the invention.

The voltage wave spikes derived from plates 48 and 53, the wave forms of which are illustrated at J and K, Fig. 2, are respectively integrated by shunt condensers 57 and 58 and series resistors 59 and 61 to produce erect and inverted sawtooth wave forms illustrated at L and M, Fig. 2. The erect sawtooth wave is applied to the cathode 28 of diode 26 while the inverted sawtooth wave is applied to the cathode 29 of diode 27. The cathode 28 is connected to ground through the large condenser 57 shunted by a low resistance resistor 62 so that the time average of the potential applied thereto, namely, the average potential of the sawtooth wave L, is at ground potential indicated by the level 63 of graphs L and N, Fig. 2.

The reshaped horizontal pulses, as illustrated at F, Fig. 2, derived from the cathode 25, are applied to the conductor 64 through a small condenser 30, the conductor 64 being connected to ground through a high resistance resistor 66. When the diode 26 is rendered conductive during the occurrence of a pulse the conductor 64 assumes the potential existing at the cathode 28 at this instant of time, that is, the potential relative to ground determined by the sawtooth potential 67 at that instant. The average potential of the conductor 64, however, is the time integral of the wave form 68, namely, the level 69, somewhat below ground potential. If the relative phase relations depicted by the graph N should vary, for example, the sawtooth wave 67 should move to the left relative to the pulse potential, the cathode 28 will have a higher potential at the instant of conductivity of the diode 26 and the entire wave form 68 would be raised resulting in a less negative average potential existing at the conductor 64. Conversely if the sawtooth wave moves to the right the average potential at conductor 64 will be more negative. In other words, the average potential at conductor 64 is determined by the level at which the pulse peak of the wave form 68 intersects the sawtooth wave 67.

In some instances the average potential of conductor 64 so determined may be used as the control potential to determine the frequency of operation of the multivibrator, however, this average potential varies not only with shift in phase between the sawtooth wave and the reformed synchronizing pulses but also is sensitive to any change in amplitude of the pulse peak of the wave form 68. Thus if the pulse peak amplitudes should vary for any reason, misoperation would be liable to result.

In order to avoid any possibility of such misoperation the second diode 27 is provided. The inverted sawtooth wave form M of Fig. 2, has its average potential 71 fixed at ground level in the absence of the application of any other potentials by a circuit consisting of a small condenser 58 connected between the cathode 29 and ground and the high resistance resistors 72 and 73 connected between the cathode 29 and the conductor 64, which in turn is connected to ground through the high resistance 66.

When, however, the pulse wave form 68 existing on conductor 64 is applied to the anode 74 of the diode 27, the diode is made conductive during the occurrence of the pulse peak and the condenser 58 is charged to the potential level 76 of this pulse peak. Since the inverted sawtooth wave form 77 is continuously applied to the cathode 29, the potential level reached by the cathode at the time the diode 29 conducts must coincide with the potential level 76 and the average potential 71 of the inverted sawtooth wave 77 is adjusted to a commensurate level above ground. Any relative phase changes between the pulse peak of the wave form 68 and the inverted sawtooth wave will, of course, result in a variation of this level. Change in pulse height, however will have no effect. The level 76 of the top of the pulse peak is determined by coincidence between this pulse peak and the erect sawtooth wave 67 by the diode 28 and its associated circuits and it is the potential of top of the peak, namely level 76, which determines the average level 71 of the inverted sawtooth wave 77, regardless of the variation in overall length of pulse peak and hence average level 69 of the wave form 68.

The average potential 71 is smoothed in appropriate filter circuits to a constant potential appearing at the terminal 31 and has a magnitude proportional to the phase error between the sawtooth wave forms and the pulse peaks 68 and essentially independent of the applied amplitude of the pulse peaks 68 provided they are higher in magnitude than the peak to peak sensing of either of the sawtooth voltages applied to the cathodes 28 and 29. This error signal is of such a polarity as to bring the sweep oscillator consisting of the multivibrator 32 and 33 and its associated circuits, into correct synchronism with the synchronizing pulses.

The voltage wave form of graph G generated at the plate 37 of triode 33 is applied to an integrator consisting of resistor 78 and condenser 79 and the integrated form is applied to the grid 81 of a triode 82. This wave form is inverted, limited and amplified and the output derived from plate 83 is further integrated in resistor 84 and condenser 86, and applied to the grid 87 of a cathode follower 88. The wave form existing at the grid 87 and cathode 89 is as shown in graph D, the phase being controlled by the circuit constants between plate 37 and cathode 89. This gating form is applied, as before described, through conductor 18 to the cathode 19 of pentode 17.

Thus the frequency of the oscillator which acts to produce the horizontal sweep pulses is controlled by a phase comparison of the signal generated thereby with the horizontal synchronism signals and in addition the oscillator output is utilized to generate a gating signal which prevents the imposition of double-frequency horizontal synchronizing signals on the critical circuits.

What is claimed is:

1. A television sweep circuit comprising, an amplifier having synchronizing signals impressed thereon, an oscillator, means operated by said oscillator output for producing sweep signals, phase detector means energized by the signals transmitted by said amplifier and signals derived from said oscillator output and producing therefrom a direct current potential whose magnitude is a function of the relative phase relation of said energizing signals, means for controlling the frequency of said oscillator in accordance with the magnitude of said direct current potential, and means for preventing signal transmission by said amplifier during the intervals between the occurrence of said synchronizing signals.

2. A television horizontal sweep circuit comprising, a differentiating circuit adapted for the reception of complete synchronization signals, gated amplifier means connected to said differentiating circuit for transmitting said differentiated complete synchronization signals and permitting only those signals to pass having horizontal synchronization periodicity, a horizontal sawtooth oscillator, comparison means for comparing the phase of the signals generated by said oscillator with the phase of the signals passed by said gated amplifier means to produce an error signal, means for applying said error signal to said oscillator to maintain it in synchronism with said horizontal synchronization signals, means for deriving a gating signal from the signals generated by said oscillator, and means for applying said gating signals to control said gated amplifier means.

3. A television horizontal sweep circuit comprising, an amplifier having horizontal synchronizing signals impressed on the input thereof, an oscillator, sweep signal means operated by the output thereof, means operated by said oscillator output for producing a sawtooth wave signal, detector means having the horizontal synchronizing signals transmitted by said amplifier and said sawtooth wave signal impressed thereon, means including said detector means for producing a direct current potential whose magnitude depends on the magnitude of the steep edge of said sawtooth wave signal at the time of occurrence of a horizontal synchronizing signal transmitted by said amplifier, and means for controlling the frequency of said oscillator in accordance with the magnitude of said direct current potential.

4. A television horizontal sweep circuit comprising, an amplifier having horizontal synchronizing signals impressed on the input thereof, an oscillator, sweep signal means operated by the output thereof, means operated by said oscillator output for producing a sawtooth wave signal, detector means having the horizontal synchronizing signals transmitted by said amplifier and said sawtooth wave signal impressed thereon, means including said detector means for producing a direct current potential whose magnitude depends on the magnitude of the steep edge of said sawtooth wave signal at the time of occurrence of a horizontal synchronizing signal transmitted by said amplifier, means for controlling the frequency of said oscillator in accordance with the magnitude of said direct current potential, means for deriving a gating signal from the output of said oscillator having a frequency of recurrence equal to the frequency of said oscillator, and means for impressing said gating signal on said amplifier to prevent transmission therethrough during the intervals between occurrence of fundamental frequency horizontal synchronizing signals.

5. A television horizontal sweep circuit comprising, an input circuit having horizontal synchronizing signals impressed thereon, means for reshaping said signals, an oscillator, sweep signal means operated by the output thereof, means for deriving a sawtooth wave signal from the output of said oscillator, means for inverting said sawtooth wave signal, a pair of diode rectifiers having the output of said reshaping means impressed on the anodes thereof, means for impressing said sawtooth wave signal on the cathode of one of said diodes, means for impressing said inverted sawtooth wave signal on the cathode of the other of said diodes, means for deriving a direct current potential from the outputs of said pair of rectifiers the magnitude of which is a function of the phase relationship between the reshaped synchronizing signals and the sawtooth and inverted sawtooth signals, and means for controlling the frequency of said oscillator in accordance with the magnitude of said direct current potential.

6. A television horizontal sweep circuit comprising, a differentiating circuit adapted for the reception of complete synchronizing signals, gated amplifier means connected to said differentiating circuit for transmitting said differentiated complete synchronizing signals and permitting only those signals to pass having horizontal synchronization periodicity, a horizontal sawtooth oscillator, comparison means for comparing the phase of the signals generated by said oscillator with the phase of the signals passed by said gated amplifier means to produce an error signal, means for applying said error signal to said oscillator to maintain it in synchronism with said horizontal synchronizing signals, and means for preventing signal transmission by said gated amplifier during the intervals between the occurrence of said horizontal synchronizing signals.

7. A television horizontal sweep circuit comprising, an amplifier having horizontal synchronizing signals impressed on the input thereof, an oscillator, sweep signal means operated by the output thereof, means operated by said oscillator output for producing a sawtooth wave signal, detector means having the horizontal synchronizing signals transmitted by said amplifier and said sawtooth wave signal impressed thereon, means including said detector means for producing a direct current potential whose magnitude depends on the magnitude of the steep edge of said sawtooth wave signal at the time of occurrence of a horizontal synchronizing signal transmitted by said amplifier, means for controlling the frequency of said oscillator in accordance with the magnitude of said direct current potential, and means for preventing signal transmission by said amplifier during the intervals between the occurrence of said horizontal synchronizing signals.

8. A television horizontal sweep circuit comprising, an input circuit having horizontal synchronizing signals impressed thereon, means for reshaping said signals, an oscillator, sweep signal means operated by the output thereof, means for deriving a sawtooth wave signal from the output of said oscillator, means for inverting said sawtooth wave signal, a pair of diode rectifiers having the output of said reshaping means impressed on the anodes thereof, means for impressing said sawtooth wave signal on the cathode of one of said diodes, means for impressing said inverted sawtooth wave signal on the cathode of the other of said diodes, means for deriving a direct current potential from the outputs of said pair of diode rectifiers the magnitude of which is a function of the pulse relationship between the reshaped synchronizing signals and the sawtooth and inverted sawtooth wave signals, means for controlling the frequency of said oscillator in accordance with the magnitude of said direct current potential, and means for preventing signal transmission from said input circuit to said reshaping means during intervals between the occurrence of said horizontal synchronizing signals.

9. A television horizontal sweep circuit comprising, an input circuit having horizontal synchronizing signals impressed thereon, means for reshaping said signals, an oscillator, sweep signal means operated by the output thereof, means for deriving a sawtooth wave signal from the output of said oscillator, means for inverting said sawtooth wave signal, a pair of diode rectifiers having the output of said reshaping means impressed on the anodes thereof, means for impressing said sawtooth wave signal on the cathode of one of said diodes, means for impressing said inverted sawtooth wave signal on the cathode of the other of said diodes, means for deriving a direct current potential from the outputs of said pair of diode rectifiers the magnitude of which is a function of the phase relationship between the reshaped synchronizing signals and the sawtooth and inverted sawtooth wave signals, means for controlling the frequency of said oscillator in accordance with the magnitude of said direct current potential, means for deriving a gating signal from the output of said oscillator having a frequency of recurrence equal to the frequency of said oscillator, and means operated by said gating signal for preventing transmission of signals from said input circuit to said reshaping means during the intervals between the occurrence of said horizontal synchronizing signals.

References Cited in the file of this patent

UNITED STATES PATENTS

| Number | Name | Date |
|---|---|---|
| 2,141,343 | Campbell | Dec. 27, 1938 |
| 2,277,000 | Bingley | Mar. 17, 1942 |
| 2,399,421 | Artzt | Apr. 30, 1946 |
| 2,521,504 | Dome | Sept. 5, 1950 |
| 2,585,929 | Gruen | Feb. 19, 1952 |
| 2,597,743 | Millspaugh | May 20, 1952 |